Patented June 13, 1939

2,162,525

UNITED STATES PATENT OFFICE 2,162,525

FLOTATION OF FINE OXIDE ORE MINERALS

Charles H. Breerwood, Narberth, Pa., assignor to Separation Process Company, a corporation of Delaware No Drawing. Application September 10, 1937, Serial No. 163,303

7 Claims. (Cl. 209—167)

This invention relates to minerals separation and more particularly to the separation of the constituent minerals in pulps of argillaceous ores of oxide compounds of the alkaline earth metals. It is especially concerned with the dispersion of slimes and the destruction of natural flocculation, whereby effective selective separations can be made easily and economically, and especially in the finer particle size fractions.

In its complete form, the invention is of especial utility for the derivation of Portland cement raw material mixtures, and components of such mixtures, from inferior argillaceous limestones, marls and chalks, and will be specifically described hereinafter in its application to such uses, but it is to be understood that it may be employed for the recovery of other oxide ores, particularly for the beneficiation of phosphates.

In many of the inferior argillaceous limestones, marls and chalks, re-crystallization is incomplete and the natural particle sizes are so fine that the material must be ground to extreme fineness to free the constituent minerals, or at least to release a sufficient proportion to permit the subsequent elimination of an excessive quantity of one or more of the constituents. In such cases, the entire pulp may properly be considered as a "slime", not readily amenable to usual methods of froth flotation. Especially when the calcite content is low or the alumina content is relatively high, separation of the extremely fine slimes by classification and their subsequent use without processing, in combination with concentrates derived from the coarser fraction, in accordance with the method of my Patent No. 2,028,313, is not completely successful, as the abundance of extreme fines may be too great, mineral bond breakage in the coarser fractions may be too incomplete, or both.

The principal minerals present in materials or ores of the types described are calcite; silica in the form of quartz, flint and/or chalcedony; silicates of alumina, usually one or more forms of mica, but frequently as talc, feldspar etc.; iron oxides, limonite and/or pyrite, and magnesia as dolomite, brucite, and/or combined with silicates of alumina, as for example phlogopite. In addition, minor quantities of other minerals are frequently present. The objectives in processing such materials are to recover a maximum of the available calcite and silica, and usually iron, and to eliminate all but a minor quantity of the compounds of alumina, including the magnesian silicates of alumina, whereby the recovered constituents may be utilized as a cement raw material mixture, or the major part thereof, for the production of modern cements, particularly those of low heat of hydration and resistant to sulphates.

The abundance of colloidal and near-colloidal matter makes differential separation of calcite from these pulps very difficult. Experiments with synthetic mixtures of finely divided calcite and quartz appear to confirm a belief that colloidal calcite films or coats the surfaces of quartz grains, and probably other siliceous minerals, causing it to react as an oxide ore mineral. However, the principal difficulty in obtaining satisfactory grades with substantial weight recoveries is attributable to pronounced natural flocculation. The persistance of natural flocculation, or re-flocculation after the calcite has been concentrated, limits the degree to which the tailing minerals can be separated from each other by hydraulic separators. Further, excessive flocculation makes thickening of the useful minerals unsatisfactory because of the quantity of water retained in the floccules.

The variety or types of the constituent minerals of such pulps makes the usual dispersing agents ineffective, or in some cases ineffective except in uneconomical quantities, and if soda ash, for example, is employed to destroy flocculation, the large quantity necessary results in poor flotation froths.

It is accordingly the principal purpose of the invention to effect a complete dispersion of the pulp to permit satisfactory concentration by froth flotation, and it is a further purpose to maintain dispersion of the flotation tailings, whereby further separations can be made. It is also an object to reduce the water content of the recovered and thickened minerals. To these ends, I have discovered that the natural flocculation can be reduced to the necessary degree and effective dispersion maintained with lignin sulphonates, preferably calcium lignin sulphonate, although sodium lignin sulphonate gives satisfactory results in most cases, particularly in the flotation tailings. I have also discovered that with most of the extremely fine pulps the dispersion can be completed with smaller quantities of one of these agents in combination with a relatively small quantity of soda ash.

In general, the invention comprises conditioning the pulp with a small quantity of calcium lignin sulphonate, the quantity usually being not more than 2 lbs per ton of dry solids, and ordinarily less, and in most cases preferably in combination with soda ash in quantities not usually exceeding 1.5 pounds per ton. The quantity of soda ash is preferably kept to the effective minimum, because for flotation, the best results are obtained when these pulps are only slightly alkaline, the alkalinity preferably not exceeding pH 8.5.

Conditioning may be carried out in a conditioner or blunger of conventional type, or the first flotation cell of a circuit may conveniently be employed, the violent agitation of the latter assisting in destroying natural flocculation, reflocculation being prevented by the disperser.

Following this step, the calcite is concentrated by light stage oiling, the collecting reagent being carefully limited in quantity, as introduced to each stage to prevent over-oiling and heavy froth flocculation and consequent mechanical trapping of fine gangue minerals in the concentrates. The total collecting reagent ordinarily will not exceed 1 lb. of oleic acid, or its equivalent, per ton of feed, and usually can be held within 0.5 to 0.8 pound. The most effective calcite collecting reagent, with reference to both grade and weight recovery, for use with these pulps and especially in cold water, is diluted saponified refined talloel, as described and claimed in the application of Vogel-Jorgensen, Serial No. 151,203, filed June 30, 1937. This reagent appears to have some dispersing characteristics and is highly selective. It may be used in highly diluted form and accordingly the quantities used at each stage may be accurately controlled. Other sodium soaps are generally unsatisfactory in that they produce soapy froths carrying relatively little weight. The amine soaps frequently produce excessive froth and are not generally satisfactory. Oleic acid is effective in relatively warm pulps, but incomplete dispersion of the acid and consequent partial over-oiling results as the pulp temperatures decrease. High titre fatty acids are even more difficult to disperse and are not selective. Some dilute emulsions of oleic acid, and high titre fatty acids, such as fish oil fatty acid approach saponified refined talloel in collecting power and selectivity, particularly emulsions stabilized with a minimum of sulphonated oil, as described and claimed in the co-pending application of Robert C. Ried, Serial No. 163,306, filed September 10, 1937. Emulsions stabilized by amine soaps or sodium soaps usually produce matted or tough froths difficult to clean and extremely difficult to thicken. Excessive frothing characteristics are undesirable, as the most effective results are obtained by controlling the froth by additions of a frothing agent, such as crysilic acid or a mixture of branched and straight chain aliphatic monohydric alcohols boiling between about 152° C. and about 162° C. obtainable along with methanol by the catalytic hydrogenization of carbon oxides, hereinafter referred to for brevity as F-I. This frother is especially satisfactory for use in the fine pulps contemplated herein as it has little if any collecting capacity and disperses readily in the pulp. The total quantity required with the desirable collectors, described above usually ranging from 0.01 to 0.2 pound per ton of feed. Pulp dilutions are not critical but the best results are obtained at dilutions ranging from about 14 to 20% dry solids.

The tailings of the flotation operation may tend to re-flocculate. This flocculation is then reduced by the introduction of a small additional quantity of lignin sulphonate, preferably calcium lignin sulphonate without, however, adding more soda ash if the water is to be used in closed circuit with the flotation cells. The silicates of alumina, and particularly the talc and micas, are then separated from the remainder by hydraulic means. The particle shapes of the dispersed micas gives them a relatively slow falling rate in water, the effective or true settling rate being about equal to a particle of one half its diameter as compared with the other minerals in the tailings, and they may be eliminated by allowing them to overflow the desired minerals with the excess water in which they are suspended. A more complete separation can be effected in an hydraulic separator such as a rake or bowl classifier, the micaceous matter being carried away in the overflow. The preferred and most complete separation of the constituents of the tailings can be effected by passing them over a concentrating table. Contrary to the common belief that mineral particles of such fineness cannot be effectively separated by tabling, I have discovered that when dispersed, as described above, decided separations of the pyrite, iron oxide, quartz and unbroken stone particles and micas may be effected and the quartz, unbroken stone and iron compounds utilized in desired proportions as a part of a mixture including the flotation concentrates.

As an alternative to the step of hydraulic separation of the flotation tailings to eliminate the micaceous matter, the dispersed tailings may be subjected to flotation concentration of the micas in an additional stage oiling circuit, in the presence of a reagent of a class giving in solution the long-chain surface-active group in the positive ion, such as dodecyl amine hydrochloride. This alternative provides for a more radical elimination of the alumina but is more expensive, and is more fully described and claimed in the co-pending application of Breerwood and Williams, Serial No. 163,305, filed September 10, 1937.

As another alternative, useful when the calcite content is relatively high but the proportion of alumina is above a desired minimum, the pulp, after conditioning with the dispersing agent, as described above, may be subjected to stage oiling with a positive ion reagent to concentrate and eliminate the micaceous matter, and the tailings employed as the major part of the cement raw material mixture, as described and claimed in the co-pending application of Breerwood and Williams, Serial No. 163,304, filed September 10, 1937.

To complete the understanding of the invention and its practical application reference is made to the following examples which will serve as guides.

The first example consists of the average results of a series of tests in which the material treated was a marl ground to pass the 200 mesh sieve with 85.5% minus 325 mesh. The pulps were diluted to 14% dry solids and conditioned, as previously described for 3 minutes at a temperature of 20° C. Complete dispersion was effected and maintained by 1.0 lb. of calcium lignin sulphonate with 0.65 lb. of soda ash per ton of dry solids. The calcite content of the feed was 70.4%. Rougher flotation was completed in 5.5 minutes with 0.9 lb. of saponified refined talloel in 5% water dilution and 0.18 lb. of crysilic acid. The grade of the concentrates was 77.7%, the grade of the tailings 36.7% and the total weight recovery 82.2%. The grade on cleaning without additional reagents was increased to 80.7% with a total weight recovery of 77.7%.

By contrast, identical pulps, without conditioning and concentrated by light stage oiling with oleic acid of 98% acid value required 18 minutes to complete flotation with 1.2 lb. of oleic acid and 0.2 lb. of crysilic acid. The concentrates had a grade of 76.8% with a total weight recovery of only 66%, and the grade of the tailings was 55.0%. Natural flocculation was persistent in the tailings. Substantially complete dispersion of similar pulps was effected with 6.0 lb. of soda ash, but the flotation froths were soapy and carried little weight. Complete dispersion of similar pulps was effective with 1.9 lbs. of calcium lignin sulphonate, but a slight reduction in weight recoveries indicated a tendency of large proportions of this agent to depress calcite.

In a second example, the material treated was a chalk having a fineness of 100% minus 200 mesh and 95% minus 325 mesh. Under equivalent conditions, 8 lbs. of soda ash were required to complete dispersion, the quantity being too great to permit satisfactory calcite concentration. With 0.6 lb. of calcium lignin sulphonate and 0.6 lb. of soda ash, dispersion was maintained for 3 minutes. With 0.6 lb. of calcium lignin sulphonate and 1.6 lbs. of soda ash, complete dispersion was maintained throughout the separating operations.

The raw material of the third example was an argillaceous limestone of extremely fine crystallization, requiring grinding to about 90% minus 325 mesh to free a sufficient proportion of the silicates of alumina to permit elimination of the excessive quantity over that desired for the raw material mixture. The actual separations were effected in the particle size fractions below 20 microns, and the fraction below 10 microns comprised slightly more than 40% of the total weight of the feed. Complete dispersion was effected and maintained during flotation of the calcite and separation of the silicates of alumina from the tailings in a hydro-separator by 1.0 lb. of calcium lignin sulphonate, without soda ash. Sodium lignin sulphonate had an apparently greater tendency to depress calcite and lower the weight recoveries, but was satisfactory in lesser quantity in combination with soda ash.

It will be understood from the foregoing that the quantities of the lignin sulphonate should be limited to the effective minimum to avoid substantial depression of the calcite, and the quantity of soda ash, if any, also limited to maintain satisfactory frothing characteristics. The wide variety of minerals and their proportions in natural ores of the types described, makes desirable specifice determinations of optimum quantities of dispersing agent, or the agent in combination with soda ash. These may readily be determined in practical operation, but can conveniently be determined in advance, and as guided by the foregoing description, by adding various proportions of the lignin sulphonate with and without quantities of soda ash to a sample of pulp of normal dilution in a glass graduate, the reduction of natural flocculation and changes in settling rates being readily apparent.

I claim:

1. In a method for concentrating calcite and removing micaceous matter from an argillaceous pulp containing an abundance of fine slimes, the steps which comprise conditioning the plup with a lignin sulphonate to disperse the constituent minerals and in quantity insufficient to serve as a collector, subjecting the dispersed pulp to froth flotation in the presence of a separate oxide ore mineral collector other than a lignin sulphonate in a stage oiling circuit, and separating the micaceous matter from the tailings of the flotation operation by hydraulic classification.

2. In a method for concentrating calcite and removing micaceous matter from an argillaceous pulp, the steps which comprise conditioning a pulp containing an abundance of fine slimes with a lignin sulphonate to disperse the constituent minerals and in quantity insufficient to serve as a collector, subjecting the dispersed pulp to froth flotation in the presence of a separate oxide ore mineral collector for a constituent mineral of said pulp, other than a lignin sulphonate in a stage oiling circuit, maintaining dispersion of the tailings flotation operation by an additional quantity of lignin sulphonate, and separating the micaceous matter therefrom by hydraulic classification.

3. In a method for concentrating calcite from inferior argillaceous lime-bearing materials in which the fineness of the natural mineral particles requires extremely fine grinding to free the constituents, and in which the principal concentrations are made from the finely divided slimes thereof, the steps which comprise conditioning such a pulp with a lignin sulphonate to disperse the constituent minerals and in quantity insufficient to serve as a collector, and subjecting the dispersed pulp to froth flotation in a stage oiling circuit, in the presence of a separate collector for a constituent mineral of said pulp, other than a lignin sulphonate.

4. In a method for concentrating calcite and removing micaceous matter from inferior argillaceous lime-bearing materials in which the fineness of the natural mineral particles requires extremely fine grinding to free the constituents, and in which the principal concentrations are made from the finely divided slimes thereof, the steps which comprise conditioning such a pulp with a lignin sulphonate to disperse the constituent minerals and in quantity insufficient to serve as a collector, subjecting the dispersed pulp to froth flotation in a stage oiling circuit in the presence of a separate oxide ore mineral collector for a constituent mineral of said pulp, other than a lignin sulphonate, and separating the micaceous matter from the tailings of the flotation operation by hydraulic classification in the presence of said lignin sulphonate.

5. In a method for separating a mineral from an argillaceous ore of an alkaline earth metal, the steps which comprise dispersing a pulp of the ore containing an abundance of fine slimes with a lignin sulphonate in quantity insufficient to serve as a collector, and subjecting the dispersed pulp to froth flotation in the presence of a separate collector for a constituent mineral of said pulp, other than a lignin sulphonate.

6. In a method for separating a mineral from an argillaceous ore of an alkaline earth metal, the steps which comprise dispersing a pulp of the ore containing an abundance of fine slimes with a lignin sulphonate in quantity insufficient to serve as a collector and subjecting the dispersed pulp to froth flotation in a stage oiling circuit in the presence of a separate collector for a constituent mineral of said pulp, other than a lignin sulphonate.

7. In a method for concentrating calcite from an argillaceous pulp containing an abundance of fine slimes, the steps which comprise conditioning the pulp with a lignin sulphonate to disperse the constituent minerals and in quantity insufficient to serve as a collector, and subjecting the dispersed pulp to froth flotation in a stage oiling circuit in the presence of a separate oxide ore mineral collector other than a lignin sulphonate.

CHARLES H. BREERWOOD.